United States Patent
Verma et al.

(10) Patent No.: US 11,042,541 B2
(45) Date of Patent: Jun. 22, 2021

(54) ELECTRONIC DEVICE AND METHOD FOR CONTROLLING THE SAME

(71) Applicant: Samsung Electronics Co., Ltd., Suwon-si (KR)

(72) Inventors: Pratik Verma, Meerut (IN); Braja Kishore Biswal, Bangalore (IN); Varsha G Maragi, Bangalore (IN); Aloknath De, Bangalore (IN); Arijit Mallik, West Bengal (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 15/720,053

(22) Filed: Sep. 29, 2017

(65) Prior Publication Data
US 2018/0095963 A1  Apr. 5, 2018

(30) Foreign Application Priority Data
Oct. 3, 2016 (IN) .............................. 201641033733

(51) Int. Cl.
*G06F 3/16* (2006.01)
*G10L 15/22* (2006.01)
(Continued)

(52) U.S. Cl.
CPC ...... *G06F 16/24522* (2019.01); *G06F 16/243* (2019.01); *G06F 16/256* (2019.01);
(Continued)

(58) Field of Classification Search
USPC ............................................. 704/9; 709/206
See application file for complete search history.

(56) References Cited

U.S. PATENT DOCUMENTS 8,676,904 B2 * 3/2014 Lindahl .................. G10L 15/22
709/206
9,495,129 B2 * 11/2016 Fleizach ................. G06F 16/94
(Continued)

FOREIGN PATENT DOCUMENTS

| WO | 02/10981 A2 | 2/2002 |
| WO | 2015/006044 A2 | 1/2015 |
| WO | 2016/149834 A1 | 9/2016 |

OTHER PUBLICATIONS

Lu et al.; "Enabling—Approximate Querying in Senor Networks"; Data and Knowledge Engineering Research venter Harbin Institute of Technology, Harbin, China; p. 169-180; XP058332697.
(Continued)

*Primary Examiner* — Seong-Ah A Shin
(74) *Attorney, Agent, or Firm* — Jefferson IP Law, LLP

(57) ABSTRACT

A method for natural language query processing in an internet of things (IoT) system and an electronic device thereof are provided. The method includes receiving a natural language query including a plurality of attributes. Further, the method includes determining, by the IoT query engine, things from a plurality of things to be queried from a unified metadata based on the plurality of attributes. The unified metadata includes information about the plurality of things connected in the IoT system. Further, the method includes sending, by the IoT query engine, at least one structural query to each of the determined things. The at least one structural query is generated based on the plurality of attributes and the determined things. Further, the method includes retrieving, by the IoT query engine, results from each of the determined things.

20 Claims, 13 Drawing Sheets

(51) Int. Cl.
    *G10L 21/10*     (2013.01)
    *G06F 16/2452*     (2019.01)
    *G06F 16/31*     (2019.01)
    *G06F 16/33*     (2019.01)
    *G06F 16/242*     (2019.01)
    *G06F 16/25*     (2019.01)
    *G06F 40/30*     (2020.01)

(52) U.S. Cl.
    CPC ........ *G06F 16/313* (2019.01); *G06F 16/3338* (2019.01); *G06F 16/3344* (2019.01); *G06F 40/30* (2020.01)

(56) References Cited

U.S. PATENT DOCUMENTS

| | | | | |
|---|---|---|---|---|
| 9,698,999 | B2* | 7/2017 | Mutagi | H04L 12/2829 |
| 9,741,343 | B1* | 8/2017 | Miles | G10L 15/01 |
| 9,966,065 | B2* | 5/2018 | Gruber | G10L 15/28 |
| 10,276,170 | B2* | 4/2019 | Gruber | G06F 16/9537 |
| 2006/0149719 | A1* | 7/2006 | Harris | G06F 16/256 |
| 2010/0332235 | A1* | 12/2010 | David | G06F 16/3329 |
| | | | | 704/275 |
| 2013/0073293 | A1* | 3/2013 | Jang | G10L 15/22 |
| | | | | 704/275 |
| 2013/0238326 | A1* | 9/2013 | Kim | G10L 15/22 |
| | | | | 704/231 |
| 2014/0370841 | A1* | 12/2014 | Roberts | H04M 1/72418 |
| | | | | 455/404.2 |
| 2015/0279366 | A1 | 10/2015 | Krestnikov et al. | |
| 2016/0080165 | A1* | 3/2016 | Ehsani | H04L 12/282 |
| | | | | 704/9 |
| 2016/0103884 | A1 | 4/2016 | Clifford et al. | |
| 2016/0125291 | A1 | 5/2016 | Eggebraaten et al. | |
| 2016/0255186 | A1* | 9/2016 | Kaneblai Martins Costa | |
| | | | | H04L 51/04 |
| | | | | 455/557 |
| 2017/0083285 | A1* | 3/2017 | Meyers | G10L 15/26 |
| 2017/0358303 | A1* | 12/2017 | Walker, II | G10L 13/02 |
| 2018/0081938 | A1* | 3/2018 | Khuong | G06F 16/24539 |
| 2018/0204569 | A1* | 7/2018 | Nadkar | G10L 15/22 |
| 2018/0308470 | A1* | 10/2018 | Park | G10L 15/22 |
| 2018/0332118 | A1* | 11/2018 | Phipps | G10L 15/18 |
| 2019/0295544 | A1* | 9/2019 | Garcia | G10L 15/26 |

OTHER PUBLICATIONS

European Office Action dated Jul. 2, 2019, Reference #: P269822EO/LXB; Application/Patent #: 17858736.6-1217/3494498 PCT/KR201711006.

European Search Report dated Oct. 6, 2020; European Appln. No. 17 858 736.6-1213.

* cited by examiner

ELECTRONIC DEVICE AND METHOD FOR CONTROLLING THE SAME

CROSS-REFERENCE TO RELATED APPLICATION(S)

This application claims the benefit under 35 U.S.C. §119(a) of an Indian provisional patent application filed on Oct. 3, 2016 in the Indian Intellectual Property Office and assigned Serial number 201641033733 and an Indian patent application filed on Mar. 20, 2017 in the Indian Intellectual Property Office and assigned Serial number 201641033733, the entire disclosures of each of which are hereby incorporated by reference.

TECHNICAL FIELD

The present disclosure relates to an internet of things (IoT) system. More particularly, the present disclosure relates to a method and apparatus for natural language query processing in the IoT system.

BACKGROUND

The internet of things (IoT) indicates the concept that mutual communication is enabled by connecting all things over a network. All the systematically recognizable objects are classified as things. The things are located at different places. Each thing may have different elements and different capabilities. Managing heterogeneous things in the IoT may become difficult. Further, processing a user query in the heterogeneous things over the IoT is also more difficult.

In the heterogeneous things, below are some of the reasons why the processing of the user query may be more difficult:
1. The heterogeneous things have a big-data framework,
2. No uniform way for seamless/simultaneous data extraction from multiple non-relational/relational databases (DBs) associated smart domains,
3. Increased query processing time due to the big-data framework,
4. More focus is required for data extraction rather than performing the data analytics process, and
5. Absence of query optimization and logical operations in heterogeneous distributed IOT environment.

Further, due to the difference in the nature of the data (e.g., structured data, unstructured data, semi-structured data etc.), different smart domains will tend to use different combination of a data store and non-data store as data storage. There is no uniform way to extract and process the data from multiple heterogeneous data stores.

The above information is presented as background information only to help the reader to understand the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for natural language query processing in an internet of things (IoT) system.

An object of an embodiment of the present disclosure is to receive, by an IoT query engine, a natural language query including a plurality of elements.

Another object of an embodiment of the present disclosure is to determine things from a plurality of things to be queried from a unified metadata based on the plurality of elements.

Another object of an embodiment of the present disclosure is to identify the plurality of elements from the natural language query using a natural language processing technique.

Another object of an embodiment of the present disclosure is to fragment the natural language query into a set of sub-inputs and a set of relational operations based on the plurality of elements.

Another object of an embodiment of the present disclosure is to generate the structural query based on the set of sub-inputs and the set of relational operations.

Another object of an embodiment of the present disclosure is to generate one or more structural query based on the plurality of elements and the determined things.

Another object of an embodiment of the present disclosure is to send one or more structural query to each of the determined things.

Another object of an embodiment of the present disclosure is to retrieve results from each of the determined things.

Another object of an embodiment of the present disclosure is to determine the things to be queried based on a criticality assessment.

Another object of an embodiment of the present disclosure is to compute the criticality assessment based on at one of the elements from the natural language query, user inputs, and elements learned over a period of time.

Another object of an embodiment of the present disclosure is to determine a statistical interference among things in the plurality of things connected in the IoT system using the criticality assessment.

Another object of an embodiment of the present disclosure is to display an aggregate of the results as a response to the natural language query.

Another object of an embodiment of the present disclosure is to determine the things by mapping each of the elements to corresponding the information about the plurality of things in the unified metadata.

In accordance with an aspect of the present disclosure, a method for natural language query processing in an IoT system is provided. The method includes receiving, by an IoT query engine, a natural language query including a plurality of attributes. Further, the method includes determining, by the IoT query engine, things from a plurality of things to be queried from a unified metadata based on the plurality of attributes. The unified metadata includes information about the plurality of things connected in the IoT system. Further, the method includes sending, by the IoT query engine, at least one structural query to each of the determined things. The at least one structural query is generated based on the plurality of attributes and the determined things. Further, the method includes retrieving, by the IoT query engine, results from each of the determined things. Furthermore, the method includes displaying, by the IoT query engine, an aggregate of the results as a response to the natural language query.

In an embodiment of the present disclosure, the plurality of things connected in the IoT system are heterogeneous things associated with heterogeneous domains.

In an embodiment of the present disclosure, the at least one structural query is generated by identifying the plurality of attributes from the natural language query using a natural language processing technique and fragmenting the natural language query into a set of sub-inputs and a set of relational operations based on the plurality of attributes.

In an embodiment of the present disclosure, the things to be queried are determined based on a criticality assessment.

In an embodiment of the present disclosure, the criticality assessment is computed based on at one of the attributes from the natural language query, user inputs, and attributes learned over a period of time.

In an embodiment of the present disclosure, the criticality assessment is used to determine a statistical interference among things in the plurality of things connected in the IoT system.

In an embodiment of the present disclosure, the things are dynamically determined by mapping each of the attributes to corresponding the information about the plurality of things in the unified metadata.

In an embodiment of the present disclosure, the unified metadata is created by connecting to the plurality of things in the in the IoT system, receiving the metadata information from each of the things in the IoT system, storing the metadata information received from each of the things in a relational database, and automatically updates the metadata information about the plurality of things based on a period interval.

In an embodiment of the present disclosure, the metadata information, about the plurality of things, includes at least one of attribute information of each of the things connected in the IoT system, periodic statistical data of each of the things connected in the IoT system, a confidence interval of each of the things connected in the IoT system, a query frequency, a table size, a past execution time, and a query cost facilitating a relational algebra operation prioritization.

In an embodiment of the present disclosure, the aggregated result is obtained based on a relational algebra operation performed on the results obtained by the determined things.

In an embodiment of the present disclosure, the results are aggregated by merging with the statistical interference when an acceptable threshold of a confidence interval is met.

In an embodiment of the present disclosure, the confidence interval is determined based on the statistical inference.

In accordance with another aspect of the present disclosure, an IoT system for natural language query processing is provided. The system includes a plurality of things communicated among each other over an IoT network. An IoT query engine is communicated to the plurality of things over the IoT network. The IoT query engine is configured to receive a natural language query including a plurality of attributes. Further, the IoT query engine is configured to determine things from the plurality of things to be queried from a unified metadata based on the plurality of attributes. The unified metadata includes information about the plurality of things connected in the IoT system. The IoT query engine is configured to send at least one structural query to each of the determined things. The at least one structural query is generated based on the plurality of attributes and the determined things. Further, the IoT query engine is configured to retrieve results from each of the determined things. Furthermore, the IoT query engine is configured to display an aggregated result as a response to the natural language query.

In accordance with another aspect of the present disclosure, an apparatus for natural language query processing in an IoT system is provided. The apparatus includes a unified metadata management unit configured to store a unified metadata including information about a plurality of things connected in the IoT system. An IoT query engine is configured to receive a natural language query including a plurality of attributes. Further, the IoT query engine is configured to determine things from the plurality of things to be queried from the unified metadata based on the plurality of attributes. Further, the IoT query engine is configured to send at least one structural query to each of the determined things and retrieve results from each of the determined things. Furthermore, the IoT query engine is configured to display an aggregated result as a response to the natural language query.

In accordance with another aspect of the present disclosure an apparatus for a computer program product is provided. The apparatus includes a computer executable program code recorded on a computer readable non-transitory storage medium. The computer executable program code when executed causing the actions include receiving, by an IoT query engine, a natural language query including a plurality of attributes. The computer executable program code when executed causing the actions include determining, by the IoT query engine, things from a plurality of things to be queried from a unified metadata based on the plurality of attributes. The unified metadata includes information about the plurality of things connected in the IoT system. The computer executable program code when executed causing the actions include sending, by the IoT query engine, at least one structural query to each of the determined things. The at least one structural query is generated based on the plurality of attributes and the determined things. The computer executable program code when executed causing the actions include retrieving, by the IoT query engine, results from each of the determined things. The computer executable program code when executed causing the actions include displaying, by the IoT query engine, an aggregate of the results as a response to the natural language query.

In accordance with another aspect of the present disclosure, a method for controlling an electronic device connected to a plurality of external devices having different domains is provided. The method includes receiving a natural language query including a plurality of elements, identifying at least one external device corresponding to the plurality of elements from among the plurality of external devices based on a database storing information that related to the at least one external device, generating a structural query to be transmitted to the at least one external device based on the plurality of elements and information that relates to the at least one external device, transmitting a structural query corresponding to each of the at least one external device, receiving at least one search result corresponding to the structural query from the at least one external device, and displaying the received search result.

The method may further include receiving a plurality of metadata information from the plurality of devices connected to the electronic device, and acquiring element information relating to the metadata information, statistic data relating to the metadata information and information relating to a reliable section of the statistical data based on the received metadata information.

The method may further include receiving newly-updated metadata information from the plurality of devices according to predetermined intervals.

The generating of the structural query may further include identifying the plurality of elements from the natural language query by using a natural language processing (NLP)

technique, dividing the natural language query into a sub query and a sub query operator based on the plurality of elements, and generating the structural query based on the sub query and the sub query operator.

The identifying of the at least one external device may include identifying the at least one device according to a priority of the natural language query, and the priority may be identified based on the plurality of elements, a user input, and an element learned for a predetermined time.

The priority may be used to determine a statistical interference among the plurality of devices.

The identifying of the at least one external device may further include matching each of the plurality of elements with information of the database corresponding to metadata information of the plurality of devices.

The generating of the structural query may include determining a type of the natural language query by analyzing the plurality of elements, and generating the structural query based on the type of the natural language query.

The generating of the structural query may include determining a user context, and generating a structural query corresponding to the user context.

In accordance with another aspect of the present disclosure, an electronic device which is connected to a plurality of external devices having different domains is provided. The electronic device includes a transceiver, a display, a memory configured to store information that relates to at least one of the plurality of the external devices, and at least one processor configured to receive a natural language query including a plurality of elements via the transceiver, identify at least one external device corresponding to the plurality of elements from among the plurality of external devices based on information stored in the memory, transmit a structural query corresponding to each of the at least one external device via the transceiver, and in response to at least one search result corresponding to the structural query being received from the at least one external device, control the display to display the received search result.

The at least one processor may further be configured to receive a plurality of metadata information from the plurality of external devices connected to the electronic device via the transceiver, and acquire element information relating to the metadata information, statistical data relating to the metadata information and information relating to a reliable section of the statistical data based on the received metadata information.

The at least one processor may further be configured to receive newly-updated metadata information from the plurality of external devices according to predetermined intervals via the transceiver.

The at least one processor may further be configured to identify the plurality of elements from the natural language query by using a natural language processing (NLP) technique, divide the natural language query into a sub query and a sub query operator based on the plurality of elements, and generate the structural query based on the sub query and the sub query operator.

The at least one processor may further identify the at least one device according to a priority of the natural language query, and the priority may be identified based on the plurality of elements, a user input, and an element learned for a predetermined time.

The priority may be used to determine a statistical interference among the plurality of devices.

The at least one processor may further be configured to match each of the plurality of elements with information of the database corresponding to metadata information of the plurality of external devices.

The at least one processor may further be configured to determine a type of the natural language query by analyzing the plurality of elements, and generate the structural query based on the type of the natural language query.

The at least one processor may further be configured to determines a user context, and generate a structural query corresponding to the user context.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
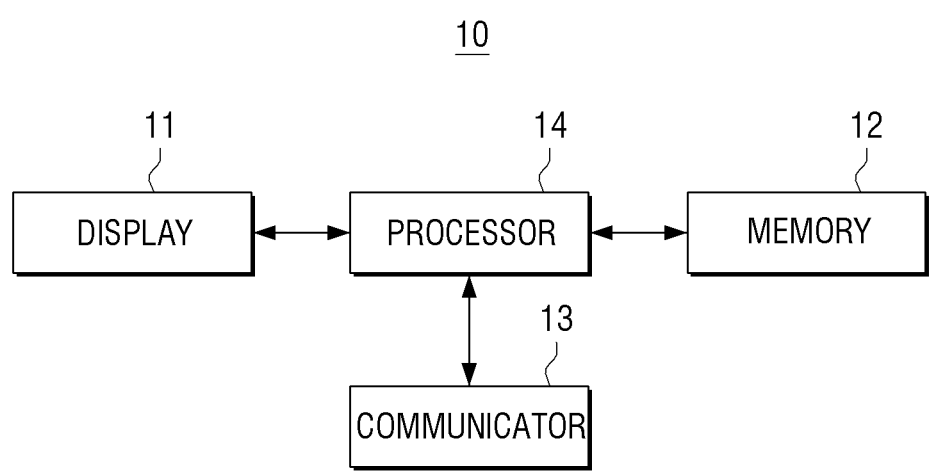
FIG. 1A and 1B illustrate an internet of things (IoT) system for natural language query processing, according to the various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Embodiments herein provide a method for natural language query processing in an internet of things (IoT) system. The method includes receiving, by an IoT query engine, a natural language query including a plurality of elements. Further, the method includes determining, by the IoT query engine, things from a plurality of things to be queried from a unified metadata based on the plurality of elements. The unified metadata includes information about the plurality of things connected in the IoT system. Further, the method includes sending, by the IoT query engine, at least one structural query to each of the determined things. The at least one structural query is generated based on the plurality of elements and the determined things. Further, the method includes retrieving, by the IoT query engine, results from each of the determined things. Furthermore, the method includes displaying, by the IoT query engine, an aggregate of the results as a response to the natural language query.

Meanwhile, a method for processing quality of a natural language in an IoT system including an IoT apparatus and an IoT query engine is disclosed herein, but the example is not limited thereto. That is, the IoT apparatus as disclosed herein may include various forms of electronic apparatuses. That is, the present disclosure is applicable to a query processing system in a case in which various forms of electronic apparatuses are connected to a query engine which analyzes queries.

Unlike the methods and the systems of the related art, the proposed method can be used to perform an approximate query processing in a time bound fashion with approximate results using the statistical inference information and the unified metadata using the IOT query engine. In order to facilitate the query processing, the proposed method can be used to generate and store the statistical information of sensor data periodically. The proposed method can be used to perform the query processing from the various databases using the statistical information and unified metadata. The proposed method can be used to identify the missing values and time series with in a confidence interval during the query processing.

Unlike the query engine of the related art, the proposed IOT query engine is configured to perform the seamless and simultaneous data extraction from multiple smart domains. Further, the IOT query engine will serve as an underlying engine to feed data into an analytics layer from the heterogeneous things. Further, the IOT query engine performs the uniform data extraction using a virtual unification across different heterogeneous things based on a key-value of the database (DB), a column family of the DB, a document information of the DB, a graph and a relational DB. The IOT query engine facilitates the approximate query processing with in the confidence interval using the statistical inference of recent past of the sensor data.

The IOT query engine will assist the query based on estimated values in case of missing sensors/data/values/nodes based on the query criticality. The IOT query engine provides support for relational algebra operations for result the aggregation from various smart-domains. The IOT query engine has an efficient query response time to evaluate optimize the query-plan in a heterogeneous distributed environment. The IOT query engine supports the cross-domain application(s) by processing the query over multiple heterogeneous distributed data sources.

The proposed system allows a virtual abstract layer that extracts the data from heterogeneous data sources across multiple domains like smart phone, smart home, smart health, connected car or the like. The virtual abstract layer enables an algebra operation like union operation, intersection operation and difference between multiple data stores. The Join-Like operation on distributed data stores will help in aggregating the query results.

Referring now to the drawings, and more particularly to FIGS. 1A and 1B, FIGS. 2 to 4, FIGS. 5A, 5B, 6, 7B, 8, 9 and 10, there are shown preferred embodiments.

FIG. 1A is a block diagram illustrating a brief configuration of an electronic device 10, according to an embodiment of the present disclosure. Referring to FIG. 1A, the electronic device 10 may include a display 11, a memory 12 (e.g., a storage), a communicator 13 (e.g., a transceiver) and a processor 14 (e.g., at least one processor).

The display 11 may display various screens on a display area. In this case, the display 11 may be implemented as various forms of display panels. For example, the display panel may be implemented using various display techniques, such as a liquid crystal display (LCD), organic light emitting diodes (OLED), active-matrix organic light-emitting diode (AM-OLED), liquid crystal on silicon (LcoS), digital light processing (DLP), or the like.

The display 11 may display an aggregate of results as a response to a natural language query.

The memory 12 may store various programs and data which are required for operations of the electronic device 10. The memory 12 may be implemented as a non-volatile memory, volatile memory, flash-memory, hard disk drive (HDD) or solid-state drive (SSD), or the like. The memory 12 may store various information detected from a plurality of IoT apparatuses.

The communicator 13 may perform communication with an external device. In this case, the communicator 13 may include various chips including a Wi-Fi chip, a Bluetooth chip, a wireless communication chip, a near-field communication (NFC) chip, and the like. The communicator 13 may receive a natural language query from a user. In this case, the natural language query may include a plurality of elements.

The processor 14 controls the overall operations of the electronic apparatus 10. In particular, the processor 14 may generate integrated metadata by processing metadata information received from a plurality of apparatuses.

In this case, the processor 14 may update the integrated metadata at predetermined intervals. That is, the processor 14 may receive metadata information at every predetermined interval from a plurality of apparatuses, and update the integrated metadata based on the received metadata information.

Meanwhile, the processor may, in response to a natural language query being received from a user, identify at least one external device based on a plurality of elements included in the natural language query. That is, the processor 14 may identify at least one external device for analyzing the plurality of elements and making queries.

The processor 14 may generate a structural query to be transmitted to an external apparatus based on a plurality of elements and information that relates to an external device to receive a query. When the processor 14 transmits a structural query to an external device via the communicator 13, the external device may acquire a result corresponding to the received structural query and transmit the acquired result to the electronic device 10.

As described above, the electronic device 10 according to various embodiment may include a display 11, a memory 12, a communicator 13 and a processor 14, but the example is not limited thereto. For example, the electronic device 10 according to various embodiments may include only a communicator 13 and a processor 14.

Specifically, when the electronic device 10 according to various embodiment includes a communicator 13 and a processor 14 only, the electronic device 10 may be coupled with external devices to supplement functions of the display 11 and the memory 12. That is, when the electronic device 10 includes the communicator 13 and the processor 14 only, various embodiments described herein may be implemented as a single system.

Specific functions of the processor 14 will be described below. In particular, the processor 14 may include an IoT query engine as will be described later. In addition, the IoT query engine may be configured as an independent device separate from the electronic device 10. Alternatively, the processor may perform a function of the IoT query engine and a separate external IoT query engine may be present.

Figure 1B:
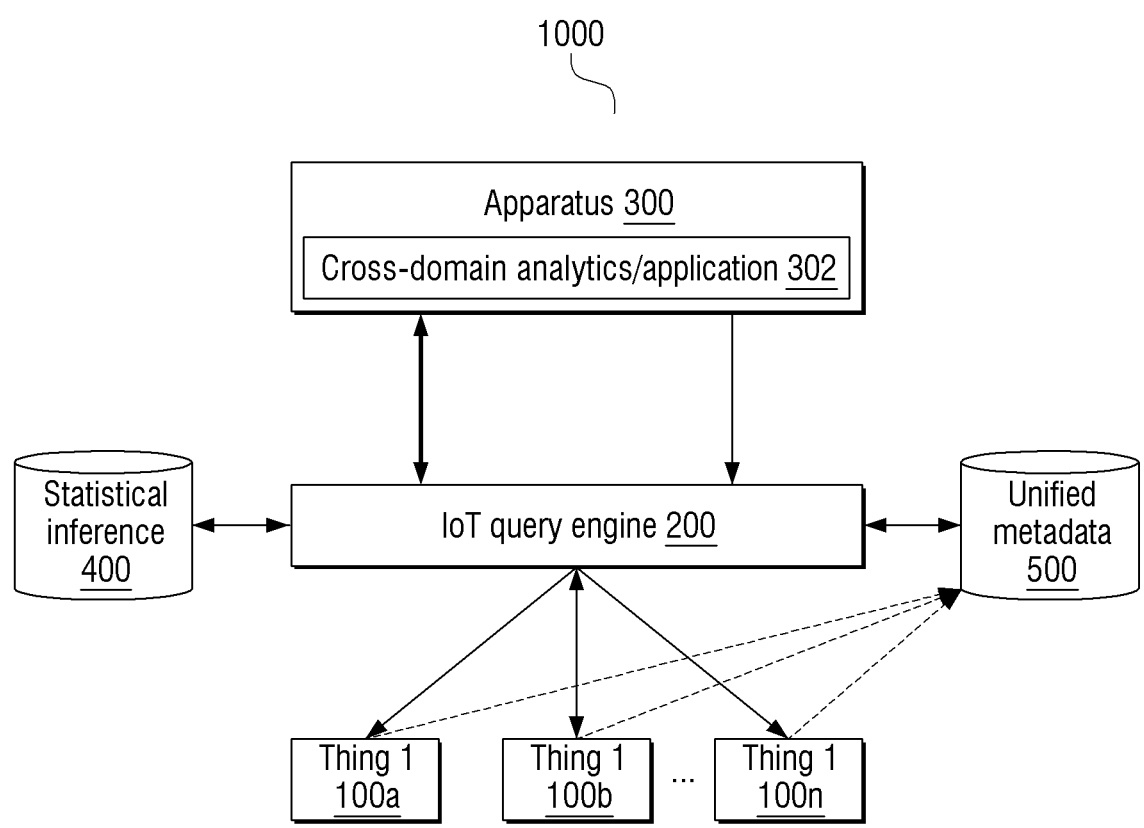

FIG. 1B illustrates an IoT system 1000 for natural language query processing, according to the various embodiments of the present disclosure. The system 1000 includes a plurality of things 100a-100n (hereafter the label of the thing is 100), an IoT query engine 200, and an apparatus 300. The plurality of things 100 are communicated among each other over an IoT network (not shown). In an embodiment, the plurality of things 100 communicated in the IoT system 1000 are heterogeneous things associated with heterogeneous domains. The heterogeneous domain can be, for example but not limited to, a smart health, a smart home, a smart office, a smart weather or the like.

Further, the IoT query engine 200 is communicated to the plurality of things 100 over the IoT network. The apparatus 300 includes a cross-domain analytics/application 302. The apparatus 300 can be, for example but not limited to, an electronic device, a wearable device, a server, a private cloud, or the like. The IoT query engine 200 is communicated with the cross-domain analytics/application 302. The cross-domain analytics/application 302 receives the information from various sources (e.g., reports, mobile Apps, or the like).

Further, the IoT query engine 200 is configured to connect with the heterogeneous data sources or heterogeneous DBs. Based on the connection with the heterogeneous data sources or the heterogeneous DBs, the IoT query engine 200 is configured to obtain the unified metadata 500 from the different data sources or the heterogeneous DBs. After obtaining the unified metadata 500, the IoT query engine 200 is configured to store the unified metadata 500 in a storage unit (not shown). Further, the IoT query engine 200 is configured to periodically update the unified metadata 500 from heterogeneous data sources or the heterogeneous DBs.

In an embodiment, the unified metadata 500 is created by connecting to the plurality of things in the in the IoT system 100, receiving the metadata information from each of the things in the IoT system 100, storing the metadata information received from each of the things in the relational database, and automatically updates the metadata information about the plurality of things based on a period interval.

The unified metadata 500 will have below set of information which will help directly serving queries faster which require statistical information. Also serving queries within confidence interval supporting fault tolerance with probabilistic results.

1. Things table metadata and corresponding element information
2. Periodic statistical data like mean, median, mode and variance
3. Mean and standard error of sampling distribution
4. Confidence interval
5. Query frequency, table size, past execution time/query cost facilitating relational algebra operation prioritization.

Further, the IoT query engine 200 is configured to receive the natural language query including a plurality of elements. In an example, the element may include a network address such as an internet protocol (IP) address. The element may also include a name such as a common name used for the type of the electronic device. The element may also include an identifier that may uniquely identify the electronic device such as a universally unique identifier.

Further, the IoT query engine 200 is configured to determine things from the plurality of things to be queried from a unified metadata 500 based on the plurality of elements. The unified metadata 500 includes information about the plurality of things 100 communicated in the IoT system 1000. The unified metadata 500 can be, for example but not limited to, a query log, a decision table, a plan cost, a histogram or the like.

Further, the IoT query engine 200 is configured to send at least one structural query to each of the determined things. The at least one structural query is generated based on the plurality of elements and the determined things (The generation of the structural query is explained in conjunction with the FIG. 5B). Further, the IoT query engine 200 is configured to retrieve results from each of the determined things. Furthermore, the IoT query engine 200 is configured to display an aggregated result as the response to the natural language query.

In an embodiment, the things to be queried are determined based on a criticality assessment.

In an embodiment, the criticality assessment is computed based on at one of the elements from the natural language query, user inputs, and elements learned over a period of time.

In an embodiment, the criticality assessment is used to determine a statistical interference 400 among things in the plurality of things connected in the IoT system 100.

In an embodiment, the results are aggregated by merging with the statistical interference 400 when an acceptable threshold of a confidence interval is met. Further, the confidence interval is determined based on the statistical interference 400.

In an embodiment, the at least one structural query is generated by identifying the plurality of elements from the natural language query using the natural language processing technique, and fragmenting the natural language query into a set of sub-inputs and a set of relational operations based on the plurality of elements.

In an embodiment, the set of relational operations along with the criticality assessment dynamically determines the statistical interference 400 among the things in the plurality of things 100 connected in the IoT system 1000.

Statistical interference 400: In an example, consider the table.1 represents the required data that can be fetched from the sensor data tables available from different IOT domains. The below data should be kept as row per element in the table in unified meta-data in data source as shown in table 1. However, selection of below elements mandatory for statistical interference 400 still needs to be answered more precisely. To start with, the data can be kept for values per sensor type element.

TABLE 1

| S. No. | Information to store | Location |
|---|---|---|
| 1. | DB Name. | Domain Tables |
| 2. | Table Name. | Domain Tables |
| 3. | Column Name. | Domain Tables |
| 4. | Current Sample Mean ($\mu$) | |
| 5. | Start Sample Deviation ($\sigma$) | |
| 6. | Sample Variance | |
| 7. | Sample Size (N) | |
| 8. | Min Value | |
| 9. | Max Value. | |
| 10. | Last Time Stamp | |
| 11. | Last Update Time | |
| 12. | Variance Noise | |
| 13. | Time Stamp Corresponding Min Value | |
| 14. | Time Stamp Corresponding Max Value. | |
| 15. | Correspond Population Mean | |
| 16. | Mode | (Histogram) |
| 17. | Median | |

Histogram: In an example, consider the table 2 represents the data which could be generated during initialization and updated periodically using the unified metadata 500. The unified metadata 500 helps to derive selectivity of particular constraint. However, if there is no clear classification in distinct values or there are too many distinct values in table 2, Better implementation of distribution/histogram needs to be generated by classification based on some threshold value.

TABLE 2

| S. No. | Information to store for element in Table | Location |
|---|---|---|
| 1 | DB Name. | Domain Tables |
| 2 | Table Name. | Domain Tables |
| 3 | Column Name. | Domain Tables |
| 4 | Value 1 (records) | |
| 5 | Value 3 (records) | |
| 6 | Value 4 (records) | |
| 7 | Value N (records) | |
| 8 | Total (Records) | (Element info) |
| 9 | Value_size | (Element info) |
| 10 | Max_records_of_value (val_K) | |
| 11 | Avg. value | (Statistics) |
| 12 | Last record Timestamp | |
| 13 | Last Update time stamp | |

Further, the IoT query engine 200 is intended to maintain track of the unified metadata 500 about various tables and elements to support decision making process of the query-cost estimation. Further, the IoT query engine 200 stores the information like tables size, element size, query frequency for each element etc. Further, the IoT query engine 200 collects data from query-execution logs but it must also be equipped with a periodic batch/real-time update process module (not shown) to keep information as updated as possible.

Further, the IoT query engine 200 is designed in such a manner that it can identify type of query, and store below information in the query log without having significant impact on the query execution time. It must also monitor time taken in data retrieval, seek time and operational cost to store query log. It must also update periodically/initially the type of index present on particular element if applicable.

In an embodiment, the things are dynamically determined by mapping each of the elements to corresponding the information about the plurality of things 100 in the unified metadata 500.

Element: In an example, consider the table 3 represents the data which could be updated periodically after every query execution. The table will keep log related to number times particular element is being queried. Also, it will keep log about type of queries being aggregation in nature or not. This could be potential information to decide for which elements statistical information can be kept handy. This would also give insight to an index requirement.

TABLE 3

| S. No. | Information to store for element | Location |
|---|---|---|
| 1. | DB Name | Domain tables |
| 2. | Table Name | Domain tables |
| 3. | Column Name | Domain tables |
| 4. | Value size | |
| 5. | Table size | |
| 6. | Index type | |
| 7. | Total Number of Records (N) | |

Query log table: The table 4 provides the data for parameter estimation. This information can be used to fine tune current model of the cost estimation. This will just collect the log data related to type of queries coming as input to the system and their corresponding execution time with some additional info and factors.

TABLE 4

| S. No. | Information to Store for element | Location |
|---|---|---|
| 1. | DB Type. | Domain Tables |
| 2. | Table Name. | Domain Tables |
| 3. | Column Name. | Domain Tables |
| 4. | Query Type (Aggregate/Select) | |
| 5. | Data retrieved MB | |
| 6. | Records retrieved | |
| 7. | Number of Nodes | |
| 8. | Index Type | |
| 9. | Constraint (yes/No) | |
| 10. | Retrieval Time | |
| 11. | Seek time | |
| 12. | Operational Time | |
| 13. | Total Actual Time | |
| 14. | Estimated Time | |

In an embodiment, the metadata information, about the plurality of things 100, includes at least one of element information of each of the things connected in the IoT system 1000, periodic statistical data of each of the things connected in the IoT system 1000, a confidence interval of each of the things connected in the IoT system 1000, a query frequency, a table size, a past execution time, and a query cost facilitating a relational algebra operation prioritization.

In an embodiment, the unified metadata 500 automatically updates the information about the plurality of things 100 based on the period interval.

In an embodiment, the aggregated result is obtained based on a relational algebra operation performed on the results obtained by the determined things.

In an embodiment, the relational algebra operation is determined based of an acceptable threshold of the confidence interval.

Unlike the query engine of the related art, the proposed IoT query engine 200 is configured to perform the seamless and simultaneous data extraction from multiple smart domains. Further, the IoT query engine 200 will serve as the underlying engine to feed data into an analytics layer from the heterogeneous things. Further, the IoT query engine 200 performs the uniform data extraction using the virtual unification across different heterogeneous things based on a key-value of the DB, a column family of the DB, a document information of the DB, a graph and a relational DB. The IoT query engine 200 facilitates the approximate query processing with in the confidence interval using the statistical inference 400 of the recent past of the sensor data.

The IoT query engine 200 will serve the query based on estimated values in case of missing sensors/data/values/nodes based on the query criticality. The IoT query engine 200 provides support for relational algebra operations for result the aggregation from various smart-domains. The IoT query engine 200 has an efficient query response time to evaluate optimize the query-plan in heterogeneous distributed environment. The IoT query engine 200 supports the cross-domain application by processing the query over multiple heterogeneous distributed data sources.

The IoT query engine 200 can be also used to crawl or process web data stored in the heterogeneous data sources. The IoT query engine 200 is being proposed to churn actual numbers or process actual sensor data to provide user with aggregated result set as query response.

Further, the usage of the IoT query engine 200 is not limited only to the sensor data on the IoT cloud, it can also be used for processing data residing various device or generic public data set. Any device consisting of various sensors and heterogeneous DBs could sever as data-server for the IoT query engine which could be combined with other data sets from various domains.

Meanwhile, the IoT query engine 200 may determine information that relates to the accuracy, urgency, user situation derived from the received natural language query. For example, the IoT query engine 200 may determine information that relates to whether it needs a prompt response rather than an accurate response, or reversely, an accurate response rather than a prompt response. The IoT query engine 200 may determine an IoT apparatus to be accessed based on the determined information, and determine a database to be used.

In an embodiment, when a natural language query received by the IoT query engine 200 needs a prompt response rather than an accurate response, the IoT query engine 200 may receive a result from only an IoT apparatus having the highest priority from among a plurality of IoT apparatuses capable of providing an appropriate result to a natural language result. Alternatively, the IoT query engine 200 may calculate a result by using only statistic information that relates to data generated from the plurality of IoT apparatuses in advance.

In another embodiment, when a natural language query received by the IoT query engine 200 needs an accurate response rather than a prompt response, the IoT query engine 200 may receive a result from all IoT apparatuses related to a natural language. In addition, the IoT query engine 200 may determine a result by receiving latest information of when a natural language query is received (or all information of up to a time point when a natural language query is received) instead of using pre-stored statistic information.

In another embodiment, the IoT query engine 200 may determine a user context related to a user situation to determine a result of a received natural language query. For example, the IoT query engine 200 may generate a structural query by using a user context related to location information of the user, time information, health state information of the user, weather information, and the like.

For example, when a natural language query "What do I eat?" is received, the IoT query engine 200 may generate a structural query by using elements included in the query "What do I eat?" and time information included in a user context. For example, when a time at which the user asked the question is morning, the IoT query engine 200 may determine that the refrigerator from among a plurality of external devices as an apparatus to which the query is to be transmitted, and generate a structural query to be transmitted to the refrigerator. Alternatively, when a time at which the user asked the question is evening, the IoT query engine 200 may determine that an external device having information related to restaurants frequently visited by the user as an apparatus to which the question is to be transmitted, and generate a structural query to be transmitted to the corresponding device.

In this regard, the user context may be predetermined information. For example, the IoT query engine 200 may generate a structural query in consideration of a predetermined user context as well, regardless of what question is received. In this case, the predetermined user context may be a context which is set by the user. Alternatively, a context acquired based on the previous queries may be automatically set.

The FIGS. 1A and 1B show the limited overview of the system 1000 but, it is to be understood that other embodiments are not limited thereto. Further, the system 1000 can include any number of hardware or software components communicating with each other. Further, the labels first and second are only used for illustrative purpose and not limiting the scope of the disclosure. For example, the component can be, but not limited to, a process running in the controller or processor, an object, an executable process, a thread of execution, a program, or a computer.

Figure 2:
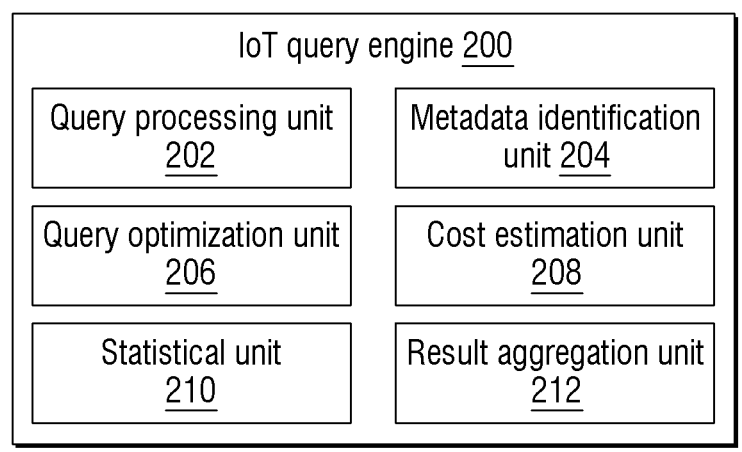
FIG. 2 illustrates various units of an IoT engine, according to the various embodiments of the present disclosure.

FIG. 2 illustrates various units of the IoT query engine 200, according to the various embodiments of the present disclosure. In an embodiment, the IoT query engine 200 includes a query processing unit 202, a metadata identification unit 204, a query optimization unit 206, a cost estimation unit 208, a statistical unit 210, and a result aggregation unit 212. The query processing unit 202 is configured to receive the natural language query including the plurality of elements. After receiving the natural language query, the metadata identification unit 204 is configured to determine things from the plurality of things to be queried from the unified metadata 500 based on the plurality of elements. The unified metadata 500 has the information about the plurality of things 100 connected in the IoT system 1000.

In an embodiment, the query processing unit 202 receives the search query from the user. After receiving the search query, the query processing unit 202 may be capable of analyzing similar, domain specific terminology that may apply in this context which may improve the search criteria and provide more relevant results for the search query. The domain specific terminology applied to this context may be prioritized based on domain relevancy.

Based on the unified metadata 500, the query optimization unit 206 is configured to identify the plurality of elements from the natural language query using the natural language processing technique. Further, the query optimization unit 206 is configured to fragment the natural language query into the set of sub-inputs and the set of relational operations based on the plurality of elements.

In an embodiment, the query optimization unit 206 is configured to parse the elements and constraint the query from the semi-structured data using the natural language processing techniques. The query can be parsed either by traditional rule based semantic matching or advanced techniques of machine learning. Further, the query optimization unit 206 is configured to map one or more keyword to actual elements from the tables and identify the constraints using the NLP (natural language processing) techniques.

Further, the query optimization unit 206 utilizes the unified metadata 500 store to identify exact table from the various domains where the particular elements are present. The different elements can be present in different type of things. Once the elements have been mapped to corresponding things, the specific sub-queries will be formed. The specific query for specific type of things will be triggered to retrieve such data into common distrusted buffer or intermediate files. After successful retrieval of intermediate/sub-query results final relational algebra operation will be performed in order to provide final desired output as query result.

In an embodiment, the set of relational operations along with the criticality assessment dynamically determines the statistical interference 400 among the things in the plurality of things 100 connected in the IoT system 1000.

In an embodiment, the things are dynamically determined by mapping each of the elements to corresponding the information about the plurality of things 100 using the unified metadata 500.

In an embodiment, the unified metadata 500 automatically updates the information about the plurality of things 100 based on the period interval.

In an embodiment, the cost estimation unit 208 is configured to process the query based on a retrieval cost, a seek time, and an operation cost.

The statistical unit 210 contains a pre-generated actual statistical information from various sensor tables. The sensor tables are generated from the various databases. The statistical unit 210 includes an internal processing unit (not shown) to keep the statistical information table to be update. At the initial setup, the statistical unit 210 fixes a time stamp for last row/column to generate the statistical information for the entire table till timestamp and store it in the unified metadata store. Once the initial values have been stored, the statistical unit 210 will be responsible to periodically scan the sensor table for new entries and update the statistical information in corresponding table.

Further, the result aggregation unit 212 is configured to send the structural query to each of the determined things. Further, the result aggregation unit 212 is configured to retrieve results from each of the determined things. After retrieving the results from each of the determined things, the result aggregation unit is configured to provide the aggregated result as the response to the natural language query. In an embodiment, the aggregated result is obtained based on the relational algebra operation performed on the results obtained by the determined things. In an embodiment, the relational algebra operation is determined based of the acceptable threshold of the confidence interval.

Although FIG. 2 shows units of the IoT query engine 200, in other implementations, the IoT query engine 200 may include fewer components, different components, differently arranged components, or additional components than depicted in the FIG. 2. Additionally or alternatively, one or more components of the IoT query engine 200 may perform functions described as being performed by one or more other components of the IoT query engine 200.

Figure 3:
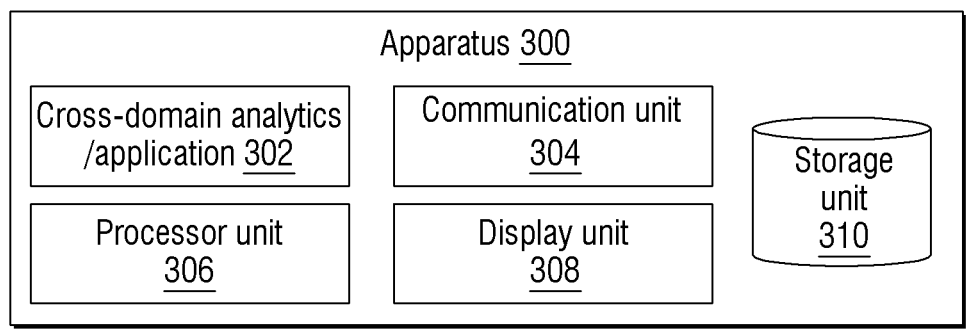
FIG. 3 illustrates an apparatus for natural language query processing, according to the various embodiments of the present disclosure.

FIG. 3 illustrates an apparatus 300 for natural language query processing, according to the various embodiments of the present disclosure. In an embodiment, the apparatus 300 includes the cross-domain analytics/application 302, a communication unit 304 (e.g., a transceiver), a processor unit 306 (e.g., at least one processor), a display unit 308 (e.g., a display) and a storage unit 310 (e.g., a memory). The communication unit 304 is configured to communicate with internal units of the apparatus 300. The communication unit 304 is configured to communicate with external units of the IoT system 1000. The communication unit 304 receives the query from the user. The communication unit 304 send the query to processor unit 306. The processor unit 306 is configured to process the query using the IOT query engine 200.

In an embodiment, the IoT query engine 200 is operated within the apparatus 100. In an embodiment, the IoT query engine 200 is operated outside the apparatus 300. The operations and functionalities of the IoT query engine 200 are explained in connection with the FIG. 1B and the FIG. 2.

In an embodiment, the processor unit 306 is intended to maintain track of the meta-data about various tables and elements to support decision making process of the query-cost estimation. Further, the processor unit 306 control the storage unit 310 to store the information like tables size, element size, query frequency for each element etc. Further, the processor unit 306 collects data from query-execution logs but it must also be equipped with a periodic batch/real-time update process module (not shown) to keep information as updated as possible. Further, the display unit 308 displays the aggregated result as the response to the natural language query.

The storage unit 310 is configured to store the element information of each of the things connected in the IoT system 1000, the periodic statistical data of each of the things connected in the IoT system 1000, the confidence interval of each of the things connected in the IoT system 1000, the query frequency, the table size, the past execution time, and the query cost facilitating the relational algebra operation prioritization.

The cross-domain analytics/application 302 is communicated with the IoT query engine 200 and the unified metadata management unit (not shown). In an embodiment, the unified metadata management unit (not shown) is configured to store the unified metadata 500 including information about the plurality of things 100 connected in the IoT system 1000.

Although FIG. 3 shows units of the apparatus 3000, in other implementations, the apparatus 3000 may include fewer components, different components, differently arranged components, or additional components than depicted in the FIG. 3. Additionally or alternatively, one or more components of the apparatus 3000 may perform functions described as being performed by one or more other components of the apparatus 3000.

Figure 4:
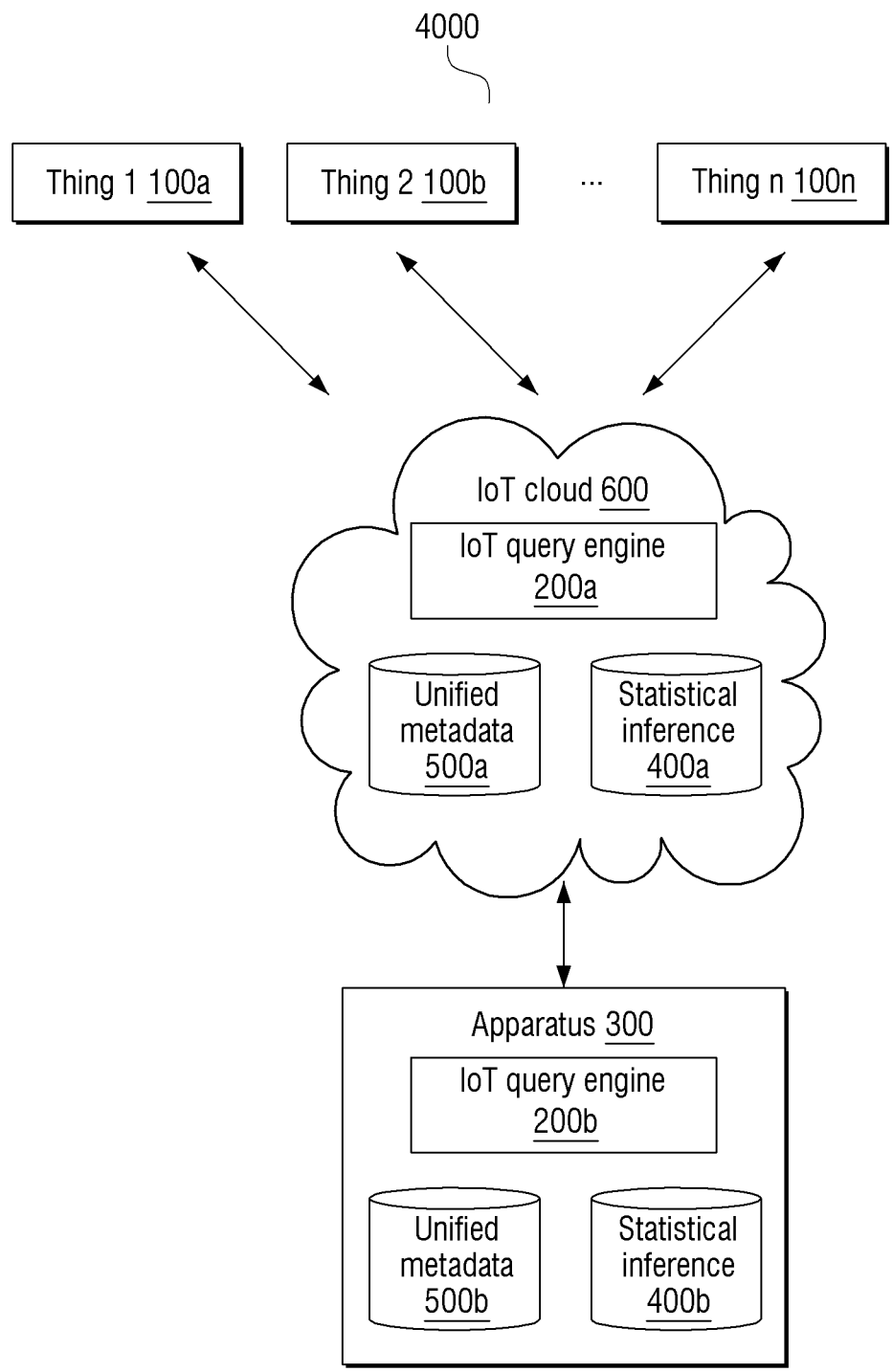
FIG. 4 illustrates an IoT system for natural language query processing over an IoT cloud, according to the various embodiments of the present disclosure.

FIG. 4 illustrates an IoT system 4000 for natural language query processing over the IoT cloud 600, according to the various embodiments of the present disclosure. The operations and functionalities of the IoT query engine 200 are explained in connection with the FIG. 1B and the FIG. 2. The IoT cloud 600 receives the data from various sources (e.g., electronic device, public cloud, wearable device, a server or the like). Unlike the systems of the related art, the proposed system 4000 can be used to perform the approximate query processing in the time bound fashion with approximate results using the statistical inference 400 and the unified metadata 500.

Meanwhile, the IoT query engines 200a and 200b may determine information that relates to the accuracy, urgency and user situation of a response derived from the received natural language query. For example, the IoT query engines 200a and 200b may determine whether the received natural language query needs a prompt response rather than an accurate response, or reversely, an accurate response rather than a prompt response.

In an embodiment, if a natural language query received from a user needs a prompt response rather than an accurate response, a result may be derived by using only the IoT query engine 200b without using the IoT query engine 200a.

Alternatively, if a natural language query received from a user needs an accurate response rather than a prompt response, a result may be derived by using both the IoT query engine 200a and the IoT query engine 200b (e.g., using the statistical inference 400a, 400b and the unified metadata 500a, 500b).

That is, the IoT system 4000 illustrated in FIG. 4 may properly adjust the amount of information processed in the IoT cloud 600 and the apparatus 300 according to the accuracy, urgency and user situation of a query received from the user.

The FIG. 4 shows the limited overview of the system 4000 but, it is to be understood that other embodiments are not limited thereto. Further, the system 4000 can include any number of hardware or software components communicating with each other. Further, the labels first and second are only used for illustrative purpose and not limiting the scope of the disclosure. For example, the component can be, but not limited to, a process running in the controller or processor, an object, an executable process, a thread of execution, a program, or a computer.

Figure 5A:
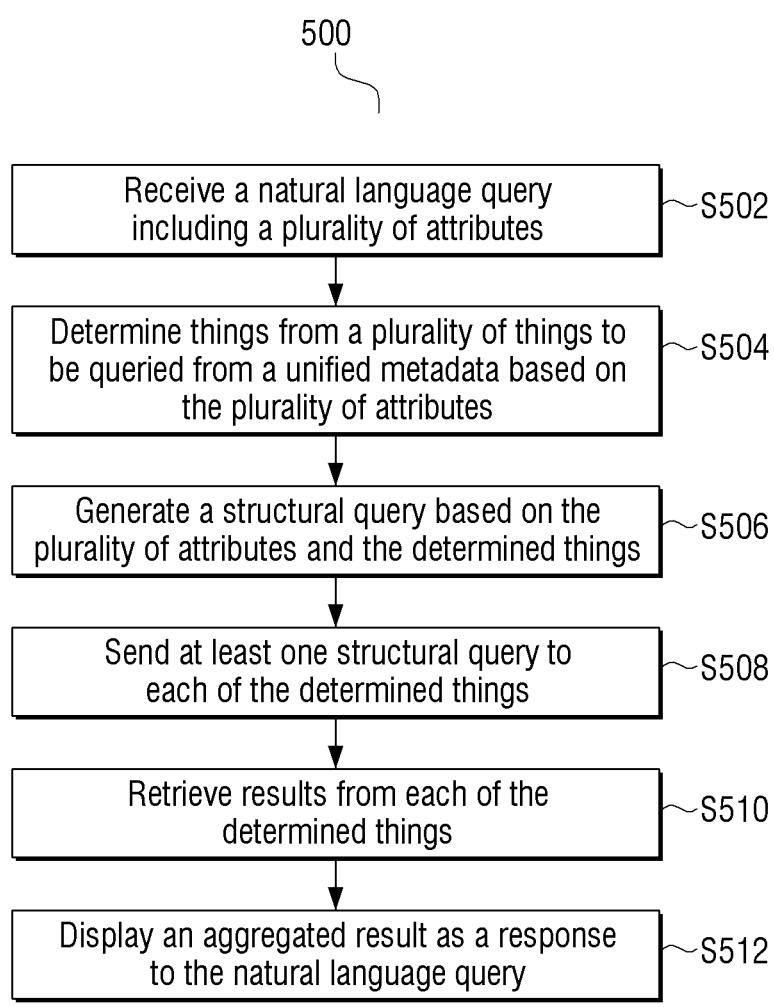
FIG. 5A is a flow diagram illustrating a method for natural language query processing in an IoT system, according to the various embodiments of the present disclosure.

FIG. 5A is flow diagram 500 illustrating a method for natural language query processing in the IoT system 1000 or 4000, according to the various embodiments of the present disclosure. At operation S502, the method includes receiving the natural language query including the plurality of elements. In an embodiment, the method allows the query processing unit 202 to receive the natural language query including the plurality of elements. At operation S504, the method includes determining the things from the plurality of things 100 to be queried from the unified metadata 500 based on the plurality of elements. The unified metadata 500 includes the information about the plurality of things 100 connected in the IoT system 1000 or 4000. In an embodiment, the method allows the metadata identification unit 204 to determine the things from the plurality of things 100 to be queried from the unified metadata 500 based on the plurality of elements.

At operation S506, the method includes generating the structural query based on the plurality of elements and the determined things. In an embodiment, the method allows the query optimization unit 206 to generate the structural query based on the plurality of elements and the determined things. The generation of the structural query is explained in detail conjunction with the FIG. 5B.

At operation S508, the method includes sending one or more structural query to each of the determined things. In an embodiment, the method allows the query processor unit 202 to send one or more structural query to each of the determined things. At operation S510, the method includes retrieving the results from each of the determined things. In an embodiment, the method allows the query processor unit 202 to retrieve the results from each of the determined things. At operation S512, the method includes displaying the aggregate of the results as the response to the natural language query. In an embodiment, the method allows the display unit 214 to display the aggregate of the results as a response to the natural language query.

In the methods of the related art, due to variety in nature of generated data (structured data, unstructured data, semi-structured data, etc.,) different smart systems will tend to use different combination of NoSQL (non SQL, no relational SQL) stores and RDBMS (Relational Data Base Management System) stores as data storage. There is no uniform way to extract and process data from multiple heterogeneous data sources. The proposed method can be used to facilitate a framework by providing virtually abstract layer over heterogeneous NoSQL and RDBMS stores. Further, the proposed method can be used to enable relational algebra operations and evaluation of query plan (equivalent expressions) with the help of the uniform metadata.

The various actions, acts, blocks, operations, and the like in the flow diagram 500a may be performed in the order presented, in a different order or simultaneously. Further, in some embodiments, some actions, acts, blocks, operations, and the like may be omitted, added, modified, skipped, and the like without departing from the scope of the disclosure.

Figure 5B:
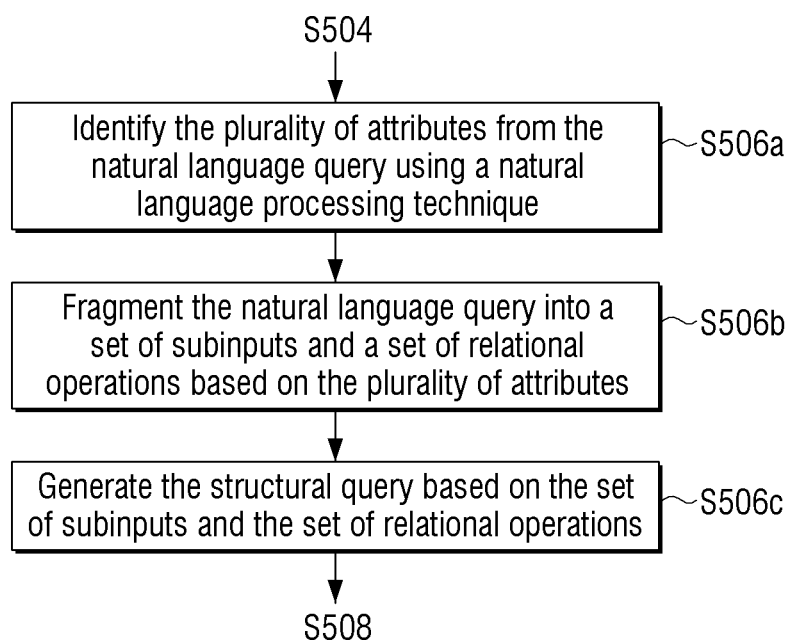
FIG. 5B is a flow diagram illustrating a method for generating a structural query, according to the various embodiments of the present disclosure.

FIG. 5B is flow diagram 506 illustrating a method for generating the structural query, according to the various embodiments of the present disclosure. At operation S506a, the method includes identifying the plurality of elements from the natural language query using the natural language processing technique. In an embodiment, the method allows the query optimization unit 206 to identify the plurality of elements from the natural language query using the natural language processing technique. At operation S506b, the method includes fragmenting the natural language query into the set of sub-inputs and the set of relational operations based on the plurality of elements. In an embodiment, the method allows the query optimization unit 206 to fragment the natural language query into the set of sub-inputs and the set of relational operations based on the plurality of elements. At operation S506c, the method includes generating the structural query based on the set of sub-inputs and the set of relational operations. In an embodiment, the method allows the query optimization unit 206 to generate the structural query based on the set of sub-inputs and the set of relational operations.

The various actions, acts, blocks, operations, and the like in the flow diagram 506 may be performed in the order presented, in a different order or simultaneously. Further, in some embodiments, some actions, acts, blocks, operations, and the like may be omitted, added, modified, skipped, and the like without departing from the scope of the disclosure.

Figure 6:
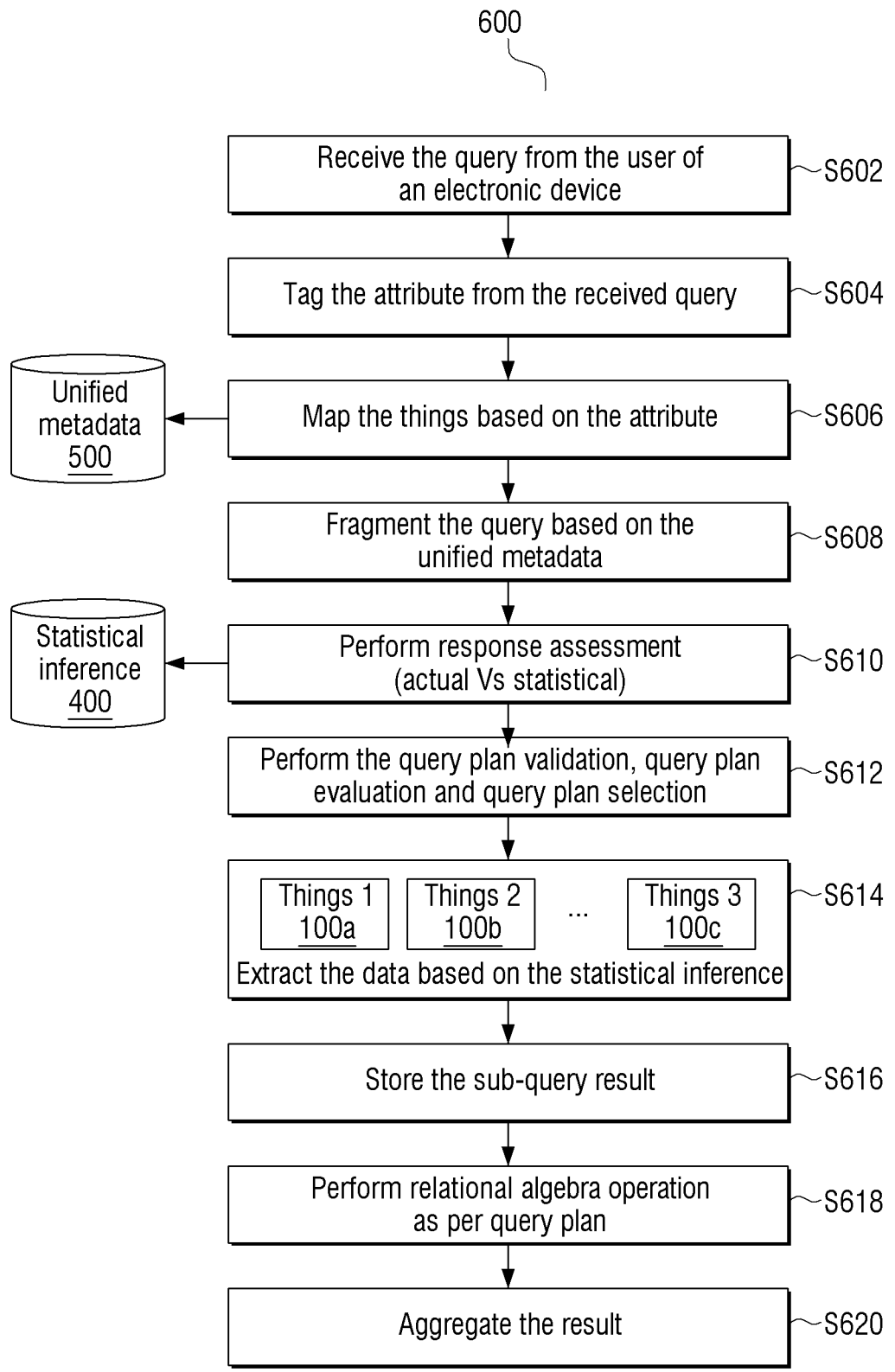
FIG. 6 is a flow diagram illustrating a method for natural language query processing in the IoT system based on a statistical inference and a unified metadata, according to the various embodiments of the present disclosure.

FIG. 6 is flow diagram 600 illustrating a method for natural language query processing in the IoT system 1000 or 4000 based on the statistical inference 400 and the unified metadata 500, according to the various embodiments of the present disclosure. At operation S602, the method includes receiving the query from the user. In an embodiment, the method allows the query processing unit 202 to receive the query from the user. At operation S604, the method includes tagging the element from the received query. In an embodiment, the method allows the metadata identification unit 204 to tag the element from the received query. At operation S606, the method includes mapping the things 100 based on the element using the unified metadata 500. In an embodiment, the method allows the metadata identification unit 204 to map the things 100 based on the element using the unified metadata 500.

In an embodiment, the elements are mapped with their corresponding databases using the unified metadata 500 of multiple heterogeneous databases (relational/non-relational).

At operation S608, the method includes fragmenting the query based on the unified metadata 500. In an embodiment, the method allows the query optimization unit 206 to fragment the query based on the unified metadata 500. At operation S610, the method includes performing the response assessment using the statistical inference 400. In an embodiment, the method allows the statistical unit 210 to perform the response assessment using the statistical inference 400. At operation S612, the method includes performing the query plan validation, the query plan evaluation and the query plan selection. In an embodiment, the method allows the statistical module 210 to perform the query plan validation, the query plan evaluation and the query plan selection.

At operation S614, the method includes extracting the data based on the statistical inference 400. In an embodiment, the method allows the query processor unit 202 to extract the data based on the statistical inference 400. At operation S616, the method includes storing the sub-query result. In an embodiment, the method allows the storage unit 216 to store the sub-query result. At operation S618, the method includes performing the relational algebra operation as per the query plan. In an embodiment, the method allows the query processor unit 202 to perform relational algebra operation as per the query plan. At operation S620, the method includes aggregating the result. In an embodiment, the method allows the query processor unit 202 to aggregate the result.

Cost-Estimation: In an example, the total time taken during processing the final query will be directly proportional to final number of input/output (I/O) operations which is directly proportional to amount of data/number of blocks to be read (variable for NOSQL based on block size).

Let estimated number of blocks (or I/O operations) to read in a buffer based on the elements is given by f (sa, sb) where (sa, sb) are the sizes of elements (a, b) after applying the constraints if any.

Total time taken in processing will be dependent seek time to locate the required block after constraint. This could vary based on an indexing technique. Let estimated seek time to locate the exact data is given by g (Ia, Ib) where (Ia, Ib) are the type of indexing on the elements a and b.

Total time consumed to perform operation output (intersection, union, except) once the data is read in the buffer for both the elements.

Let final seek time to locate the exact data is given by h(op) where (op) are the type of operation needs to performed to achieve final result (like intersection, union, except).

Further, selectivity based on histogram would be used to predict amount of relevant data. Writing cost/time involved in writing final results have not be considered for optimization due to its independence in any case.

Hence based on above assumptions cost of query processing can be given by following function:

$$J(sa, sa, Ia, Ib, op) = \begin{bmatrix} c1 & c2 & c3 \end{bmatrix} \begin{bmatrix} f(sa, sb) \\ g(Ia, Ib) \\ h(op) \end{bmatrix}$$

Where constant c1, c2, c3>0 f (sa, sb)=Estimated Number of blocks to be read (or I/O operations) in the buffer where the sizes of elements is given by(sa, sb).

g(Ia, Ib)=Estimated number of blocks need to be accessed to locate the required data for a and b where (Ia, Ib) are the type of indexing on element a and b.

h(op)=Total time consumed to perform operation op (intersection, union, except) once the data is read in the buffer for both the elements Also (sa, sb), g(Ia, Ib)and h(op)>0. These are strictly positive function as number of blocks to read and time consumed in seeking/operations can never be negative.

In order to calculate estimated cost for different physical plans for query processing and choose the plan which is having mining estimated cost J given by:

$$J(sa, sa, Ia, Ib, op) = \begin{bmatrix} c1 & c2 & c3 \end{bmatrix} \begin{bmatrix} f(sa, sb) \\ g(Ia, Ib) \\ h(op) \end{bmatrix}$$

Or $$J(sa, sa, Ia, Ib, op) = c1 f(sa, sb) + c2 g(Ia, Ib) + c3 h(op)$$

Let query involves blocks from n different type of NoSQL stores. Let Vector B represents blocks required from each type of NoSQL store to process final query result. Vector I represent different type of indexing BTree, Binary, Full Scan, Primary, Secondary.

$$B = \begin{bmatrix} b1 \\ b2 \\ b3 \\ \vdots \\ bN \end{bmatrix} I = \begin{bmatrix} BT \\ B \\ FS \\ P \\ S \end{bmatrix} op = \begin{bmatrix} I \\ Y \\ \sim \end{bmatrix}$$

Hence a plan Set of every possible plan P can be given from space such that: P=B×I×op Let $P_v$ is set of valid physical query plans $\{p_1, p_2, p_3 \ldots p_n\}$ such that: $P_v \subset P$ In order to compute $J(p_n)$ for all $p_n \in P_v$ or $\{p_1, p_2, p_3 \ldots p_n\}$ and then choose plan $p_n$ which satisfies $\min\{J(p_1), J(p_2), J(p_3) \ldots J(p_n)\}$ for execution.

Let's say net size of data to retrieved for element a or subquery A after applying constraint is given by S(a). Size of single tuple/record in intermediate output result of subquery A is given by r(a). Relationship between total size of intermediate results and number of total records/tuples to retrieved is given by N(a). S(a), N(a), r(a) are mentioned below.

$$S(a) = Size_{condition}(a),$$

$$r(a) = DataSize_{condition}(a),$$

$$N(a) = \frac{Size_{condition}(a)}{DataSize_{condition}(a)}$$

With above parameters function f(sa, sb) can be defined as the following. Functional will output effective number of blocks $$f(sa, sb) = \begin{cases} \max\left(\frac{S_k}{b_k n_{no\ of\ Nodes}} \text{ for all } k \in \{a, b\}\right) & \text{when Retreival is parallel from } NoSQL \text{ into Buffer} \\ \sum_{k=a}^{a,b} \frac{S_k}{b_k n_{no\ of\ Nodes}} & \text{when Retreival is sequential from } NoSQL \text{ into Buffer} \\ \text{Constant when data to reterived is very less} \end{cases}$$

With above parameters function g(Ia,Ib) can be estimated based on following cost function seek(idx) depending on type of indexing and size of Blocks to access. Functional will output effective number of blocks $$g(Ia, Ib) = k_1 seek(Ia) + k_2 seek(Ib)$$

Where constants $k_1, k_2 > 0$ $$g(Ia, Ib) = k_1 \text{ seek } (Ia) + k_2 \text{ seek } (Ib) \text{ Where constants } k_1, k_2 > 0 \text{ seek } (idx) =$$

$$\begin{cases} b_k \text{ Linear Search} \\ \log_2(b_k) + \frac{SC(A, R)}{F_r} - 1 \text{ Binary search } w\ sp \text{ Case Priamry Key } (\log_2(b_k)) \\ HT + \frac{SC(A, R)}{F_r} \text{ BTree Index where } HT \text{ depth of tree} \end{cases}$$

Once data is read into buffer for all required elements (A, B) then operation cost can be estimated based on cost required to sort data for individual elements and cost required to merge the sorted elements in order to achieve the final result. Function h(Ia, Ib) will be addition of costs related to two functions as follows:

$$sortCostFunch(a) = \begin{cases} Sort(a) + sort(b) & \text{if sorting is sequential} \\ \max(sort(a), sort(b)) & \text{if sorting is done in parlell} \end{cases}$$

$$mergeCostFunch(a) = \begin{cases} Ystore \text{ everything removing duplicate} \\ Isotre \text{ result only records present in both files} \\ \sim store \text{ results only when not in Both file} \end{cases}$$

Total Query Processing Time: Let, once cost $J(p_n)$ has been estimated for all $p_n$ belonging to set of valid plans $P_v$ or $\{p_1, p_2, p_3 \ldots p_i, \}$ and a plans $p_s \in P_v$ has been selected such than estimated cost $J(p_s)$ is minimum. If $$J(p_s) = \min\{J(p_1), J(p_2), J(p_3) \ldots J(p_n)\}$$

Hence, select query plan for execution is $p_s$.

In such case total Time of Query Processing $T_{QP}$ can be given as follows.

$$T_{QP} = T_{pre-processing} + \Delta T_{Plan\ selection\ p_s} + \Delta T_{Plan\ execution\ p_s} + \Delta T_{Post-processing}$$

Where, $T_{pre-processing}$: Time taken is query parsing using Unified meta–data, fragmentation, segregation, and redirection.

$T_{Plan\ selection\ p_s}$:
Time taken in cost estimation of plans and plan selection $p_s$ with min $J(p_s)$ $\Delta T_{Plan\ execution\ p_s}$: Actual execution time consumed for selected plan $p_s$ $\Delta T_{Post-processing}$
Post processing time could any combination file writing, Results Display, Frontend The various actions, acts, blocks, operations, and the like in the flow diagram 600 may be performed in the order presented, in a different order or simultaneously. Further, in some embodiments, some actions, acts, blocks, operations, and the like may be omitted, added, modified, skipped, and the like without departing from the scope of the disclosure.

Figure 7A:
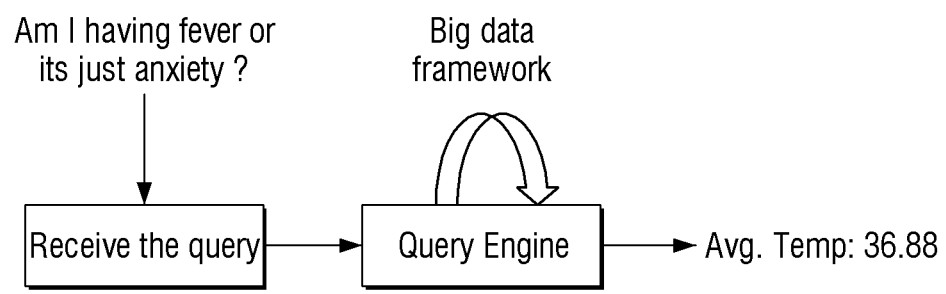
FIG. 7A is an example illustration in which the query is processed over the IoT system, according to the embodiments of the related art.

FIG. 7A is an example illustration in which the query is processed over the IoT system, according to the related art. Referring to FIG. 7A, if the traditional query engine receives the query "Am I having fever or its just anxiety?" means, the traditional query engine access the full big-data associated with the all databases without any normalization process and scaling function. This results in increasing the processing time and inaccurate response (i.e., Avg. Temp: 36.88). Consider the case, if the electronic device receives the data 1 kb per second means, the daily data will be 84.3 MB and yearly data will be 30 GB. If the electronic device receives the data 5 kb per minute means, the daily data will be 7.2 MB and yearly data will be 2.6 GB. This results in increasing usage space of the databases.

Figure 7B:
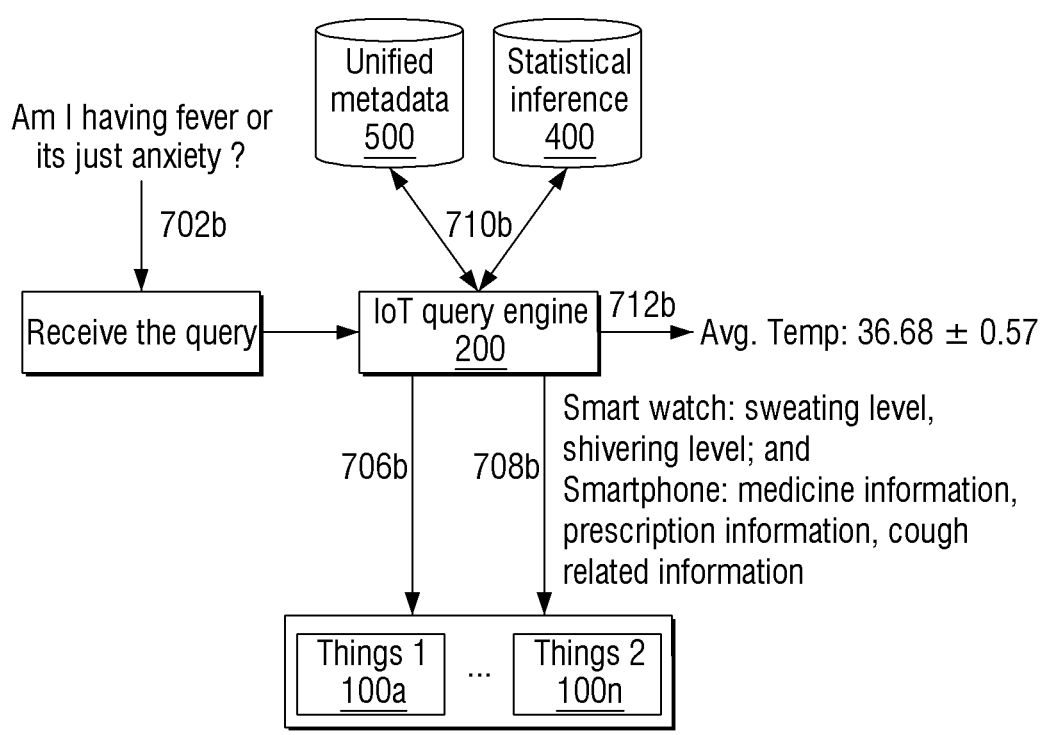
FIG. 7B, FIG. 8 and FIG. 9 are example illustrations in which the query are processed over the IoT system, according to the various embodiments of the present disclosure.

FIG. 7B is an example illustration in which the query is processed over the IoT system 1000 or 4000, according to the various embodiments of the present disclosure. Referring to FIG. 7B, the user of the wearable device contains the information related to the user activity. The information can be, for example but not limited to, a body temperature, a stress level, a sweating level, a shivering level, muscle aches, a heartbeat level, or the like. The user of the electronic device contains the information related to the past user treatment. The information can be, for example but not limited to, a health data, a medicine information, prescription information, a cough related information or the like. Further, the IoT query engine 200 identifies the unified metadata 500 from the various devices (e.g., electronic device, wearable devices, or the like) associated with the user. Further, all information is/are periodically synchronized with the IoT query engine 200. Further, the IoT query engine 200 determines the statistical interference information 400.

Further, the IoT query engine 200 receives in operation 702b the query "Am I having fever or its just anxiety?" After receiving the query, the IoT query engine 200 process in operation 704b the query based on the element (e.g., user ID, body temperature, stress level, sweating level, shivering level, medicine information, prescription information, cough related information or the like). Further, the IoT query engine 200 finds in operations 706b to 710b the relevant things (e.g., smart health domain or the like) based on the unified metadata 500 and the statistical interference information 400. The relevant things are communicated over the private cloud, the public cloud, the web, or other sources. After finding the relevant things, the IoT query engine 200 fragments the sub-query (e.g., fetch the body temperature during the last fever time and fetch the health data during the last fever time). Further, the IoT query engine 200 determines the cost estimation value based on the sub-queries and the set of relational operations among the things. Further, the IoT query engine 200 obtains in operation 712b the relevant result based on the actual results and average values driven from the statistical interference information 400. Further, the IoT query engine 200 retrieves the relevant results based on the liner function, the scaling function and the normalizing function.

Further, the IoT query engine 200 retrieves (i.e., Avg. Temp: 36.68±0.57) the relevant results based on the recent past data, the predicted time series data, and the probabilistic confidence interval. This results in reducing the processing time and improving accurate response results.

Figure 8:
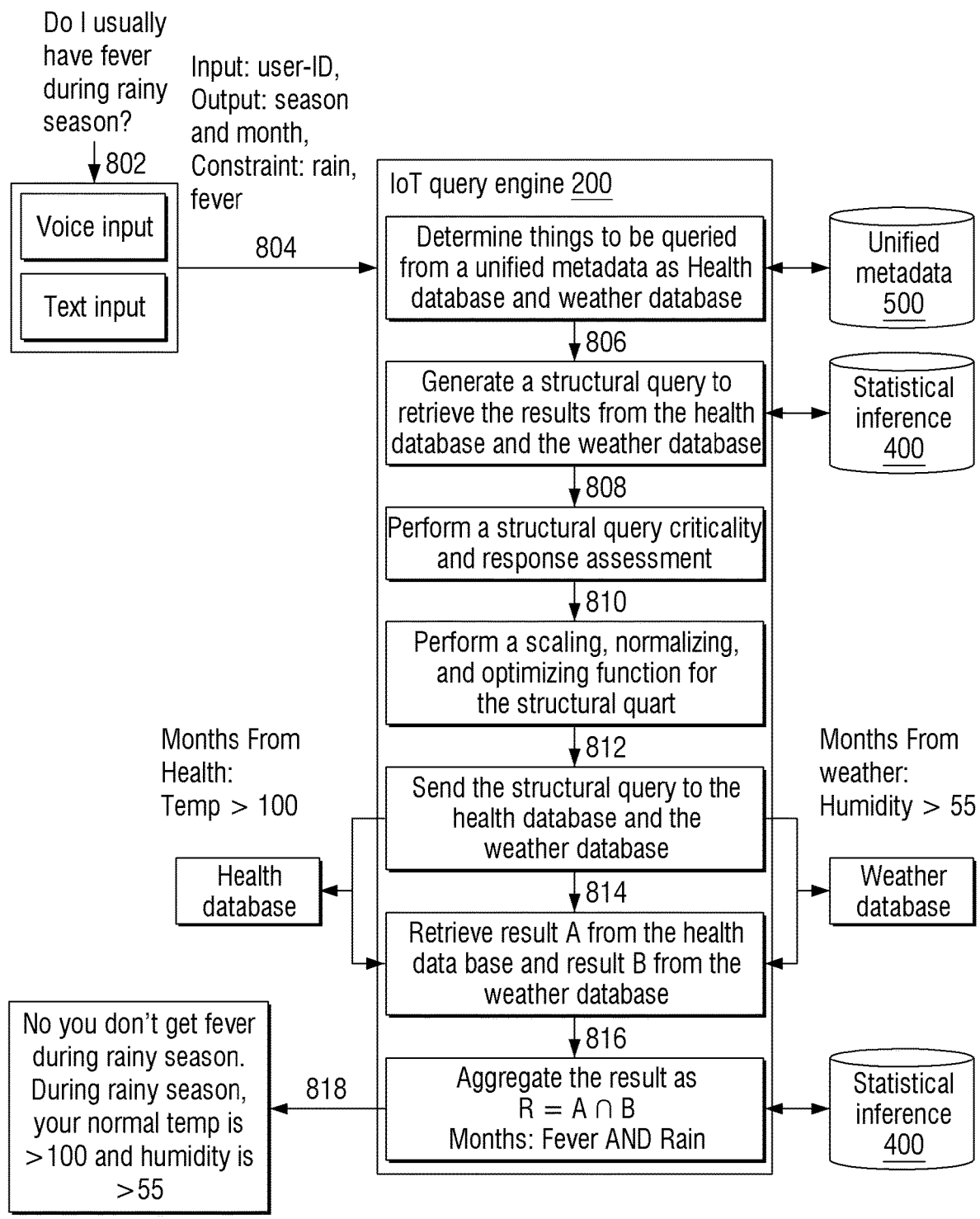

FIG. 8 is an example illustration in which the query is processed over the IoT system, according to the various embodiments of the present disclosure.

Referring to FIG. 8, the user provides in operation 802 query "Do I usually have fever during rainy season?" in the electronic device. The query processing unit 202 processes the query. The IoT query engine 200 receives the query from the query processing unit 202. After receiving the query, the IoT query engine 200 process the query based on the element (e.g., user ID, body temperature, stress level, sweating level, shivering level, medicine information, prescription information, cough related information, season, rain, weather, humidity, or the like).

Based on the query, the IoT query engine 200 determines in operation 804 the things to be queried from the unified metadata 500 as health database and the weather database. After determining the things, the IoT query engine 200 generates in operation 806 the structural query (e.g., fetch the fever related information during the rainy season and fetch the health data during the rainy season) to retrieve the results from the health database and the weather database. Further, the IoT query engine 200 performs in operation 808 the structural query criticality and response assessment and performs in operation 810 the scaling, normalizing, and optimizing function for the structural quart. Further, the IoT query engine 200 sends in operation 812 the structural query to the health database and the weather database. Further, the IoT query engine 200 retrieves in operation 814 results (e.g., result A from the health data base and result B from the weather database).

Further, the IoT query engine 200 determines the cost estimation value based on the sub-queries and the set of relational operations among the things. Further, the IoT query engine 200 obtains the relevant result based on the actual results and average values driven from the statistical interference information 400. Further, the IoT query engine 200 retrieves the relevant results based on the liner function, the normalizing function, and the scaling function. Further, the IoT query engine 200 aggregates in operation 816 the result based on the logical operations and provides in operation 818 the result (i.e., no you don't get fever during rainy season. During rainy season, your normal temp is >100 and humidity is >55) to the user.

Figure 9:
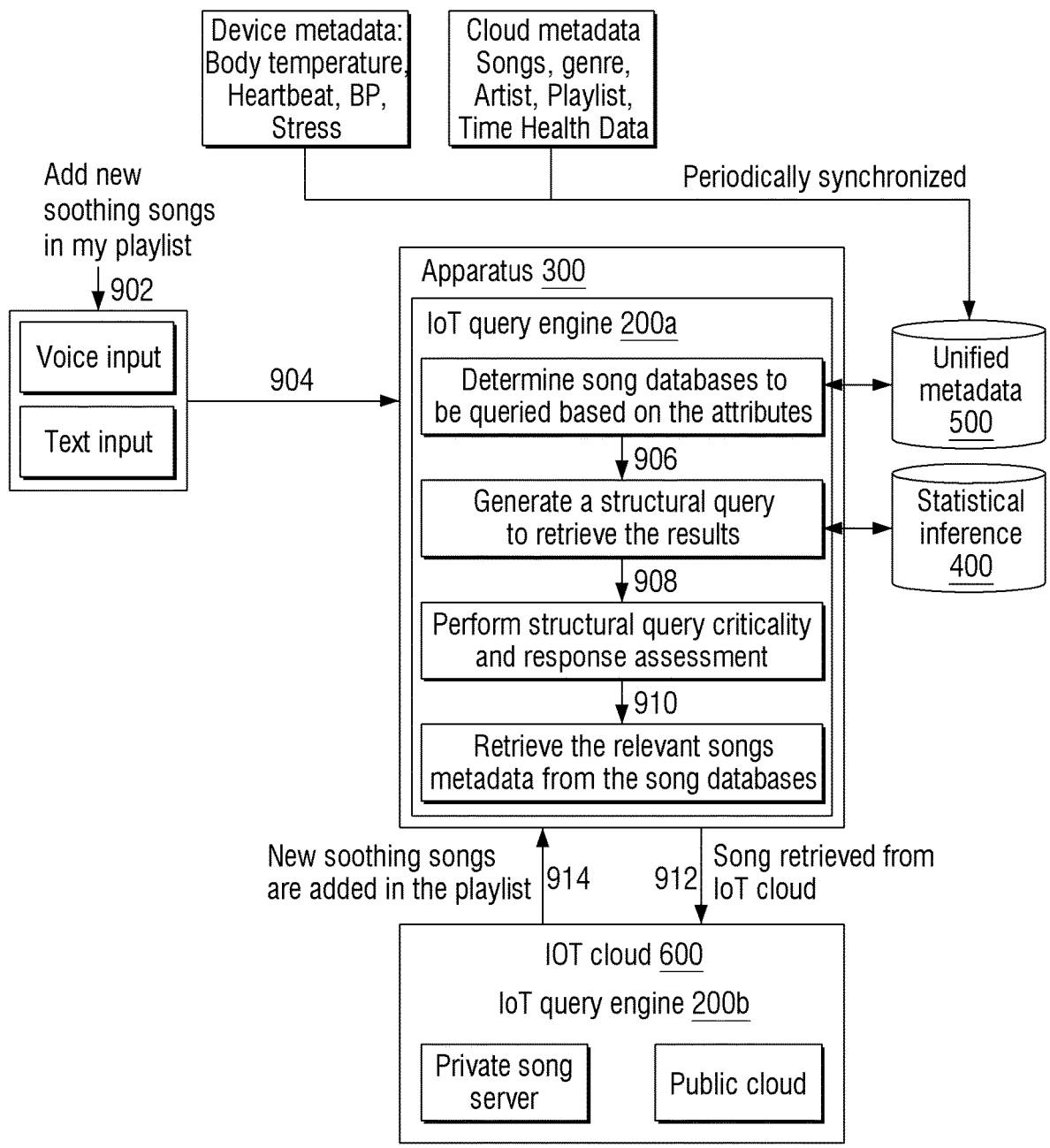

FIG. 9 is an example illustration in which the query is processed over the IoT system, according to the various embodiments of the present disclosure.

Referring to FIG. 9, the user of a smart watch contains the information related to the user activity. The information can be, for example but not limited to, the body temperature, the BP level, the heartbeat level, the stress level or the like. The user of the smart phone contains the information related to the user activity. The information can be, for example but not limited to, a set of songs, an artist, a playlist, a health data or the like. Further, the IoT query engine 200 identifies the unified metadata 500 from the various devices (e.g., smart phone, smart watch, or the like) associated with the user. Further, all information is/are periodically synchronized with the IoT query engine 200. Further, the IoT query engine 200 determines the statistical interference information 400.

The user provides in operation 902 query "add new soothing songs in my playlist" in the electronic device. Once, the IoT query engine 200 receives the query. After receiving the query, the IoT query engine 200 process the query based on the element (e.g., new songs, soothing, BP level, heartbeat level, playlist level, user ID, or the like). Further, the IoT query engine 200 determines in operation 904 the song databases to be queried based on the elements. Further, the IoT query engine 200 finds the relevant things (e.g., databases or the like) based on the unified metadata 500 and the statistical interference information 400.

Further, the IoT query engine 200 generates in operation 906 the structural query (e.g., fetch the songs features and fetch the health data from the smart watch and the smart phone) to retrieve the results. Further, the IoT query engine 200 performs in operation 908 the structural query criticality and response assessment. Further, the IoT query engine 200 retrieves in operation 910 the relevant songs metadata from the song databases. Further, the IoT query engine 200 finds the cost estimation value based on the sub queries and the set of relational operations among the song databases. Based on the relevant songs metadata, the IoT query engine 200 retrieves in operation 912 the relevant songs from the IoT cloud 600. After retrieving the songs, the new soothing songs are added in operation 914 in the playlist of the electronic device.

Figure 10:
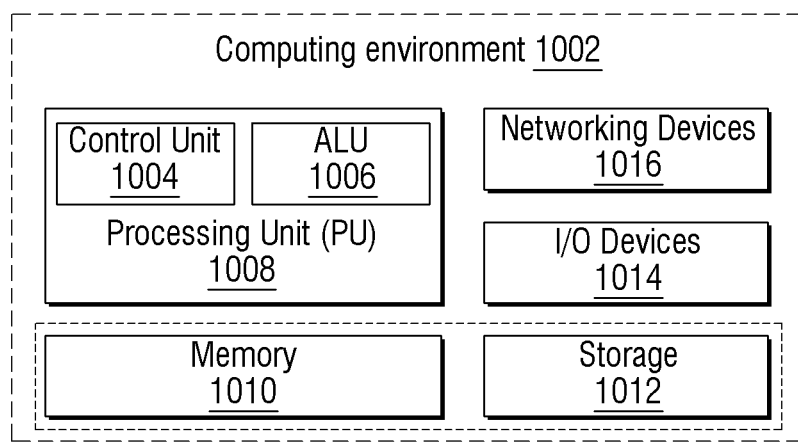
FIG. 10 illustrates a computing environment implementing a mechanism for natural language query processing in the IoT system, according to the various embodiments of the present disclosure.

FIG. 10 illustrates a computing environment 1002 implementing a mechanism for natural language query processing in the IoT system 1000 or 4000, according to various embodiments of the present disclosure. The computing environment 1002 comprises at least one processing unit 1008 (e.g., at least one processor) that is equipped with a control unit 1004 (e.g., a controller), an arithmetic logic unit (ALU) 1006, a memory 1010, a storage unit 1012, a plurality of networking devices 1016 and a plurality input/output (I/O) devices 1014. The processing unit 1008 is responsible for processing the instructions of the technique. The processing unit 1008 receives commands from the control unit 1004 in order to perform its processing. Further, any logical and arithmetic operations involved in the execution of the instructions are computed with the help of the ALU 1006.

Referring to FIG. 10, the overall computing environment 1002 can be composed of multiple homogeneous or heterogeneous cores, multiple central processing units (CPUs) of different kinds, special media and other accelerators. The processing unit 1008 is responsible for processing the instructions of the technique. Further, the plurality of processing units 1004 may be located on a single chip or over multiple chips.

The technique comprising of instructions and codes required for the implementation are stored in either the memory unit 1010 or the storage 1012 or both. At the time of execution, the instructions may be fetched from the corresponding memory 1010 or storage 1012, and executed by the processing unit 1008.

In case of any hardware implementations various networking devices 1016 or external I/O devices 1014 may be connected to the computing environment 1002 to support the implementation through the networking unit and the I/O device unit.

The embodiments disclosed herein can be implemented through at least one software program running on at least one hardware device and performing network management functions to control the elements. The elements shown in the FIGS. 1 through 10 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an electronic device connected to a plurality of external devices having different domains, the method comprising:

receiving a natural language query including a plurality of elements;

identifying information that indicates whether an urgency or an accuracy is to be prioritized by the received natural language query;

adjusting an amount of information to be processed by the electronic device based on whether the urgency or the accuracy is to be prioritized by the received natural language query;

identifying at least one external device corresponding to the plurality of elements from among the plurality of external devices based on a database storing information that relates to the at least one external device and the adjusted amount of information to be processed by the electronic device;

generating a structural query to be transmitted to the at least one external device among the plurality of external devices based on the plurality of elements and information that relates to the at least one external device;

transmitting a structural query corresponding to each of the at least one external device;

receiving at least one search result corresponding to the structural query from the at least one external device; and displaying the received search result, wherein the identifying the at least one external device further comprises:

based on identifying that the urgency is to be prioritized, identifying the at least one external device using statistic information that relates to data generated from the plurality of the external devices in advance, based on identifying that the urgency is to be prioritized, identifying the at least one external device using all data generated by the plurality of the external devices related to the natural language, and wherein the generating of the at least one structural query is based on approximate query processing using a statistical interference among the plurality of external devices.

2. The method as claimed in claim 1, further comprising:

receiving a plurality of metadata information from the plurality of devices connected to the electronic device; and acquiring element information relating to the metadata information, statistic data relating to the metadata information and information relating to a reliable section of the statistical data based on the received metadata information.

3. The method as claimed in claim 2, further comprising:

receiving newly updated metadata information from the plurality of external devices according to predetermined intervals.

4. The method as claimed in claim 1, wherein the generating of the structural query comprises:

identifying the plurality of elements from the natural language query by using a natural language processing (NLP) technique, dividing the natural language query into a sub query and a sub query operator based on the plurality of elements, and generating the structural query based on the sub query and the sub query operator.

5. The method as claimed in claim 1,
wherein the identifying of the at least one external device comprises identifying the at least one device according to a priority of the natural language query, and
wherein the priority is identified based on the plurality of elements, a user input, and an element learned for a predetermined time.

6. The method as claimed in claim 5, wherein the priority is used to determine a statistical interference among the plurality of devices.

7. The method as claimed in claim 1, wherein the identifying of the at least one external device comprises matching each of the plurality of elements with information of the database corresponding to metadata information of the plurality of external devices.

8. The method as claimed in claim 1, wherein the generating of the structural query comprises:
determining a type of the natural language query by analyzing the plurality of elements, and
generating the structural query based on the type of the natural language query.

9. The method as claimed in claim 8, wherein the generating of the structural query comprises:
determining a user context, and
generating a structural query corresponding to the user context.

10. An electronic device connected to a plurality of external devices having different domains, the electronic device comprising:
a transceiver;
a display;
a memory configured to store information that relates to at least one of the plurality of the external devices; and
at least one processor configured to:
receive a natural language query including a plurality of elements via the transceiver,
identify information that indicates whether an urgency or an accuracy is to be prioritized by the received natural language query,
adjust an amount of information to be processed by the electronic device based on whether the urgency or the accuracy is to be prioritized by the received natural language query,
identify at least one external device, from among the plurality of external devices, corresponding to the plurality of elements from among the plurality of external devices based on information stored in the memory and the adjusted amount of information to be processed by the electronic device,
transmit a structural query corresponding to each of the at least one external device via the transceiver, and
in response to at least one search result corresponding to the structural query being received from the at least one external device, control the display to display the received search result,
wherein the identifying the at least one external device further comprises:
based on identifying that the urgency is to be prioritized, identifying the at least one external device using statistic information that relates to data generated from the plurality of the external devices in advance,
based on identifying that the urgency is to be prioritized, identifying the at least one external device using all data generated by the plurality of the external devices related to the natural language, and
wherein the generating of the at least one structural query is based on approximate query processing using a statistical interference among the plurality of external devices.

11. The electronic device as claimed in claim 10, wherein the at least one processor is further configured to:
receive a plurality of metadata information from the plurality of external devices connected to the electronic device via the transceiver, and
acquire element information relating to the metadata information, statistical data relating to the metadata information and information relating to a reliable section of the statistical data based on the received metadata information.

12. The electronic device as claimed in claim 11, wherein the at least one processor is further configured to receive newly-updated metadata information from the plurality of external devices according to predetermined intervals via the transceiver.

13. The electronic device as claimed in claim 10, wherein the at least one processor is further configured to:
identify the plurality of elements from the natural language query by using a natural language processing (NLP) technique,
divide the natural language query into a sub query and a sub query operator based on the plurality of elements, and
generate the structural query based on the sub query and the sub query operator.

14. The electronic device as claimed in claim 10,
wherein the at least one processor is further configured to identify the at least one external device according to a priority of the natural language query, and
wherein the priority is identified based on the plurality of elements, a user input, and an element learned for a predetermined time.

15. The electronic device as claimed in claim 14, wherein the priority is used to determine a statistical interference among the plurality of devices.

16. The electronic device as claimed in claim 10, wherein the at least one processor is further configured to match each of the plurality of elements with information of the database corresponding to metadata information of the plurality of external devices.

17. The electronic device as claimed in claim 10, wherein the at least one processor is further configured to:
determine a type of the natural language query by analyzing the plurality of elements, and
generate the structural query based on the type of the natural language query.

18. The electronic device as claimed in claim 17, wherein the at least one processor is further configured to:
determine a user context, and
generate a structural query corresponding to the user context.

19. The electronic device as claimed in claim 10, wherein the at least one processor is further configured to retrieve metadata information related to the plurality of external devices from one or more databases.

20. The electronic device as claimed in claim 19, wherein the one or more databases is/are cloud-based.

* * * * *